US010493987B2

(12) United States Patent
Ohsugi

(10) Patent No.: US 10,493,987 B2
(45) Date of Patent: Dec. 3, 2019

(54) TARGET-LANE RELATIONSHIP RECOGNITION APPARATUS

(71) Applicant: Toyota Jidosha Kabushiki Kaisha, Toyota-shi, Aichi-ken (JP)

(72) Inventor: Masamichi Ohsugi, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 216 days.

(21) Appl. No.: 15/712,794

(22) Filed: Sep. 22, 2017

(65) Prior Publication Data
US 2018/0086342 A1 Mar. 29, 2018

(30) Foreign Application Priority Data

Sep. 29, 2016 (JP) .................................. 2016-190888

(51) Int. Cl.
| | |
|---|---|
| *B60W 30/12* | (2006.01) |
| *G01C 21/30* | (2006.01) |
| *B60W 30/18* | (2012.01) |
| *G06K 9/00* | (2006.01) |
| *G08G 1/16* | (2006.01) |
| *B60W 30/095* | (2012.01) |

(52) U.S. Cl.
CPC ...... *B60W 30/12* (2013.01); *B60W 30/18163* (2013.01); *G01C 21/30* (2013.01); *G06K 9/00798* (2013.01); *G08G 1/167* (2013.01); *B60T 2201/08* (2013.01); *B60W 30/095* (2013.01)

(58) Field of Classification Search
CPC .......... B60W 30/12; B60W 30/18163; B60W 30/095; G06K 9/00805; G06K 9/00798; G08G 1/167; B60T 2201/08; G01C 21/30
USPC .................................... 701/1, 446, 469, 448
See application file for complete search history.

(56) References Cited

U.S. PATENT DOCUMENTS

| | | |
|---|---|---|
| 6,311,123 B1 | 10/2001 | Nakamura et al. |
| 2008/0040039 A1 | 2/2008 | Takagi |
| 2011/0222732 A1 | 9/2011 | Higuchi et al. |
| (Continued) | | |

FOREIGN PATENT DOCUMENTS

| | | |
|---|---|---|
| JP | H10100821 A | 4/1998 |
| JP | 2001014597 A | 1/2001 |
| (Continued) | | |

*Primary Examiner* — Nadeem Odeh
(74) *Attorney, Agent, or Firm* — Dinsmore & Shohl LLP

(57) ABSTRACT

A target-lane relationship recognition apparatus mounted on a vehicle includes a sensor that detects a situation around the vehicle, a memory device in which a map data indicating a boundary position of a lane on a map is stored, and a processing device. The processing device is configured to: (a) acquire, based on the sensor detection result, target information regarding a moving target and a stationary target around the vehicle; (b) acquire, based on the map data and position-orientation of the vehicle, lane geometry information indicating a lane geometry around the vehicle; (c) adjust the lane geometry to generate an adjusted lane geometry satisfying a condition that the moving target is located within a lane and the stationary target is located outside of any lane; and (d) generate target-lane relationship information indicating a positional relationship between the moving target and the adjusted lane geometry.

10 Claims, 12 Drawing Sheets

(56) References Cited

U.S. PATENT DOCUMENTS

2017/0039856 A1* 2/2017 Park .................. B60K 35/00
2017/0329000 A1 11/2017 Masui et al.

FOREIGN PATENT DOCUMENTS

| | | |
|---|---|---|
| JP | 2004-082912 A | 3/2004 |
| JP | 2007-253714 A | 10/2007 |
| JP | 2007310595 A | 11/2007 |
| JP | 2010072973 A | 4/2010 |
| JP | 2011065219 A | 3/2011 |
| WO | 2016084506 A1 | 6/2016 |

* cited by examiner

TARGET-LANE RELATIONSHIP RECOGNITION APPARATUS

CROSS-REFERENCE TO RELATED APPLICATION(S)

This application claims priority to Japanese Patent Application No. 2016-190888 filed on Sep. 29, 2016, the entire contents of which are hereby incorporated by reference.

BACKGROUND

Technical Field

The present disclosure relates to a technique for recognizing a positional relationship between a target and a lane around a vehicle.

Background Art

The followings are known as conventional techniques for recognizing a preceding vehicle traveling in the same lane as a subject vehicle.

Patent Literature 1 discloses a radar device mounted on a vehicle. The radar device detects a vehicle speed and a yaw rate of the vehicle by the use of sensors, and calculates a road curvature based on the detection result. Subsequently, based on the calculated road curvature, the vehicle speed, and a lane width, the radar device sets a determination area that reflects a lane shape in front of the vehicle. In addition, the radar device uses a radar to detect other vehicles around the vehicle. Then, the radar device identifies, as a preceding vehicle, one with the smallest inter-vehicle distance among the other vehicles existing in the above-mentioned determination area.

Patent Literature 2 discloses an inter-vehicle distance measurement apparatus. The inter-vehicle distance measurement apparatus emits laser beams in front of a vehicle to measure a position of an obstacle and a distance to the obstacle. The inter-vehicle distance measurement apparatus detects the obstacle with the measured distance being equal to or less than a threshold value as a preceding vehicle candidate. The inter-vehicle distance measurement apparatus repeatedly performs the detection of the preceding vehicle candidate and selects a preceding vehicle from the preceding vehicle candidates.

LIST OF RELATED ART

Patent Literature 1: JP-2007-253714
Patent Literature 2: JP-2004-082912

SUMMARY

To recognize a positional relationship between a target and a lane around a vehicle is useful, for example, for a driving assist control and an autonomous driving control. It is therefore desirable to recognize with high accuracy the positional relationship between the target and the lane around the vehicle.

In the case of the technique disclosed in Patent Literature 1, a determination area that reflects a lane shape in front of a vehicle is taken into consideration in order to identify a preceding vehicle traveling in the same lane as the vehicle. However, a shape of the determination area is determined on the basis of a road curvature at a current position of the vehicle. Therefore, even if a curvature of the lane changes in front of the vehicle, the change in the curvature is not reflected in the determination area. That is to say, the determination area does not necessarily reflect an actual lane shape. When such the determination area is used, a positional relationship between the preceding vehicle and the lane cannot be obtained with high accuracy.

In the case of the technique disclosed in Patent Literature 2, the preceding vehicle is selected based only on the inter-vehicle distance. A lane shape in front of the vehicle is not taken into consideration.

An object of the present disclosure is to provide a technique that can recognize with high accuracy a positional relationship between a target and a lane around a vehicle.

A first aspect provides a target-lane relationship recognition apparatus mounted on a vehicle.

The target-lane relationship recognition apparatus includes:

a sensor configured to detect a situation around the vehicle;

a memory device in which a map data indicating a boundary position of a lane on a map is stored; and a processing device.

The processing device is configured to perform:

target information acquisition processing that acquires, based on a result of detection by the sensor, target information regarding a moving target and a stationary target around the vehicle;

lane geometry acquisition processing that acquires, based on the map data and a position and an orientation of the vehicle, lane geometry information indicating a lane geometry around the vehicle;

lane geometry adjustment processing that adjusts the lane geometry to generate an adjusted lane geometry satisfying a condition that "the moving target is located within a lane and the stationary target is located outside of any lane"; and information generation processing that generates target-lane relationship information indicating a positional relationship between the moving target and the adjusted lane geometry.

A second aspect further has the following features in addition to the first aspect.

The lane geometry is represented by a group of plural elements.

The processing device performs the lane geometry adjustment processing with maintaining a relative positional relationship between the plural elements.

A third aspect further has the following features in addition to the first or second aspect.

The target information includes a position of a representative point of the moving target.

The above-mentioned condition includes "the representative point being located within a lane."

A fourth aspect further has the following features in addition to any one of the first to third aspects.

The target information includes respective positions of a plurality of detected points defining a range of the moving target.

The above-mentioned condition includes "all of the plurality of detected points being located within a same lane."

A fifth aspect further has the following features in addition to any one of the first to fourth aspects.

The target information includes a trajectory of the moving target.

The above-mentioned condition includes "the trajectory being located within a same lane."

A sixth aspect further has the following features in addition to any one of the first to fifth aspects.

The target information includes a position and a velocity of the moving target.

In the lane geometry adjustment processing, the processing device predicts a future position of the moving target based on the position and the velocity of the moving target, and adds "the future position remaining in a same lane as a current position" to the above-mentioned condition.

A seventh aspect further has the following features in addition to any one of the first to sixth aspects.

The target information includes a position and a velocity of the moving target. In the lane geometry adjustment processing, the processing device calculates a tangent line of a lane boundary closest to the moving target, and adds "an angle between the tangent line and a vector of the velocity being equal to or less than a threshold value" to the above-mentioned condition.

An eighth aspect further has the following features in addition to any one of the first to seventh aspects.

In the target information acquisition processing, the processing device further acquires the target information regarding a lane changing target that is a moving target in a middle of lane changing.

In the lane geometry adjustment processing, the processing device adds "the lane changing target overlapping a lane boundary" to the above-mentioned condition.

A ninth aspect further has the following features in addition to any one of the first to eighth aspects.

The target-lane relationship recognition apparatus further includes a communication device configured to acquire, through a vehicle-to-vehicle communication or a vehicle-to-infrastructure communication, another vehicle's lane information indicating a travel lane of another vehicle around the vehicle.

In the lane geometry adjustment processing, the processing device adds "any of the moving target being located within the above-mentioned travel lane" to the above-mentioned condition.

A tenth aspect further has the following features in addition to any one of the first to ninth aspects.

In the lane geometry adjustment processing, the processing device recognizes a white line position based on the result of detection by the sensor, and adds "a distance between the white line position and a lane boundary being equal to or less than a threshold value" to the above-mentioned condition.

An eleventh aspect further has the following features in addition to any one of the first to tenth aspects.

The processing device further performs a driving assist control or an autonomous driving control by using the target-lane relationship information.

According to the first aspect, the lane geometry around the vehicle is acquired based on the accurate map data. It is therefore possible to know the lane geometry around the vehicle more accurately as compared with the technique disclosed in Patent Literature 1. Furthermore, the lane geometry is not used as it is but converted into the adjusted lane geometry by the lane geometry adjustment processing. In the lane geometry adjustment processing, such a constraint condition consistent with an actual condition that "the moving target is located within a lane and the stationary target is located outside of any lane" is imposed. By using the adjusted lane geometry satisfying such the constraint condition, it is possible to recognize with high accuracy a positional relationship between the target and the lane around the vehicle. Moreover, to impose the constraint condition in the lane geometry adjustment processing enables rapid convergence of computation, which contributes to reduction in a computation load and a computation time.

According to the second aspect, in the lane geometry adjustment processing, a lane shape (i.e. the relative positional relationship between the plural elements) is maintained without change. As a result, accuracy of the lane geometry adjustment processing is increased.

According to the third aspect, the position of the representative point of the moving target is used as the information related to the position of the moving target. In this case, the lane geometry adjustment processing is simplified and thus the computation load is reduced.

According to the fourth aspect, the respective positions of the plurality of detected points defining the range of the moving target are used as the information related to the position of the moving target. Since the range (i.e. a size) of the moving target is taken into account, the accuracy of the lane geometry adjustment processing is increased.

According to the fifth aspect, the trajectory of the moving target is used as the information related to the position of the moving target. Since the trajectory of the moving target is taken into account, the accuracy of the lane geometry adjustment processing is increased.

According to the sixth aspect, the constraint condition considering the future position of the moving target is added. As a result, the accuracy of the lane geometry adjustment processing is further increased.

According to the seventh aspect, the constraint condition considering a traveling direction of the moving target is added. As a result, the accuracy of the lane geometry adjustment processing is further increased.

According to the eighth aspect, the constraint condition considering the lane changing target is added. As a result, the accuracy of the lane geometry adjustment processing is further increased.

According to the ninth aspect, the constraint condition considering the information acquired through the communication is added. As a result, the accuracy of the lane geometry adjustment processing is further increased.

According to the tenth aspect, the constraint condition considering the white line position around the vehicle is added. As a result, the accuracy of the lane geometry adjustment processing is further increased.

According to the eleventh aspect, it is possible to perform the driving assist control or the autonomous driving control with high accuracy.

DETAILED DESCRIPTION

Embodiments of the present disclosure will be described below with reference to the attached drawings.

1. Outline

To recognize a positional relationship between a target and a lane around a vehicle is useful for a driving assist control and an autonomous driving control. For example, let us consider a case where the vehicle recognizes a preceding vehicle traveling in the same lane and follows the preceding vehicle. In this case, in order to accurately recognize the preceding vehicle, it is important to accurately recognize a positional relationship between a surrounding target and a surrounding lane. A technique that can accurately recognize such the positional relationship is provided in an embodiment of the present disclosure.

Figure 1:
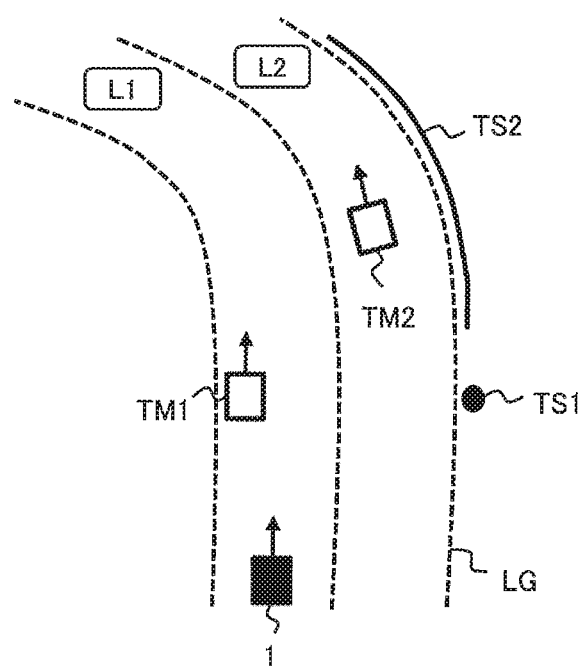
FIG. 1 is a conceptual diagram for explaining an outline of an embodiment of the present disclosure.

FIG. 1 is a conceptual diagram for explaining an outline of the embodiment of the present disclosure. A first lane L1 and a second lane L2 adjacent to each other are shown in FIG. 1. A vehicle 1 is traveling in the first lane L1. The vehicle 1 has a function of recognizing a positional relationship between a surrounding target and a surrounding lane (L1, L2).

More specifically, the vehicle 1 according to the present embodiment uses a sensor to detect a situation around the vehicle 1. Based on the result of detection by the sensor, the vehicle 1 can acquire information regarding the target around the vehicle 1. Here, the target around the vehicle 1 is roughly classified into two types, a "moving target TM" and a "stationary target TS."

The moving target TM is a target moving relative to the earth's surface, and is typically another vehicle. In the example shown in FIG. 1, two moving targets TM1 and TM2 are shown. The moving target TM1 is a preceding vehicle traveling in the same first lane L1 as the vehicle 1. The moving target TM2 is a preceding vehicle traveling in the second lane L2 adjacent to the first lane L1.

The stationary target TS is a target remaining stationary on the earth's surface, and is typically a roadside structure. In the example shown in FIG. 1, two stationary targets TS1 and TS2 are shown. The stationary target TS1 is a traffic sign standing on a roadside of the second lane L2. The stationary target TS2 is a guardrail installed along the roadside of the second lane L2.

Moreover, the vehicle 1 according to the present embodiment refers to a map data to acquire information indicating a "lane geometry LG" around the vehicle 1. More specifically, information indicating a boundary position of each lane on a map is beforehand recorded in the map data. The vehicle 1 can recognize a position and an orientation (posture) of the vehicle 1 on the map by utilizing a general GPS (Global Positioning System) and the like. Therefore, the vehicle 1 is able to recognize the lane geometry LG regarding the surrounding lane (L1, L2) by referring to the map data and the position and the orientation of the vehicle 1.

In this manner, the information regarding the target (TM1, TM2, TS1, TS2) around the vehicle 1 is acquired from the result of detection by the sensor. In addition, the information indicating the lane geometry LG around the vehicle 1 is acquired from the map data. By combining the two kinds of information, it is possible to recognize a positional relationship between the surrounding target (TM1, TM2, TS1, TS2) and the surrounding lane (L1, L2). In the example shown in FIG. 1, it is possible to recognize that the moving target TM1 is traveling ahead in the same first lane L1 as the vehicle 1 and the moving target TM2 is traveling ahead in the adjacent second lane L2.

Note here that, according to the present embodiment, the lane geometry LG around the vehicle 1 is acquired from the accurate map data. In the case of Patent Literature 1 (JP-2007-253714) described above, the lane shape in front of the vehicle is estimated based on the road curvature at the current position. According to the present embodiment, on the other hand, such the estimation based on the local road curvature is unnecessary. It is therefore possible to know the lane geometry LG around the vehicle 1 more accurately as compared with the technique disclosed in Patent Literature 1. As a result, accuracy of recognition of the positional relationship between the surrounding target and the surrounding lane is enhanced.

It should be noted that the position and the orientation of the vehicle 1 on the map are necessary for acquiring the surrounding lane geometry LG from the map data. In general, the information on the position and the orientation of the vehicle 1 can be acquired by utilizing the GPS and the like. However, the vehicle position-orientation information thus acquired is likely to include an error. In order to overcome this problem, processing of "adjusting" the lane geometry LG acquired from the map data is performed according to the present embodiment. Such the processing is hereinafter referred to as "lane geometry adjustment processing."

Figure 2:
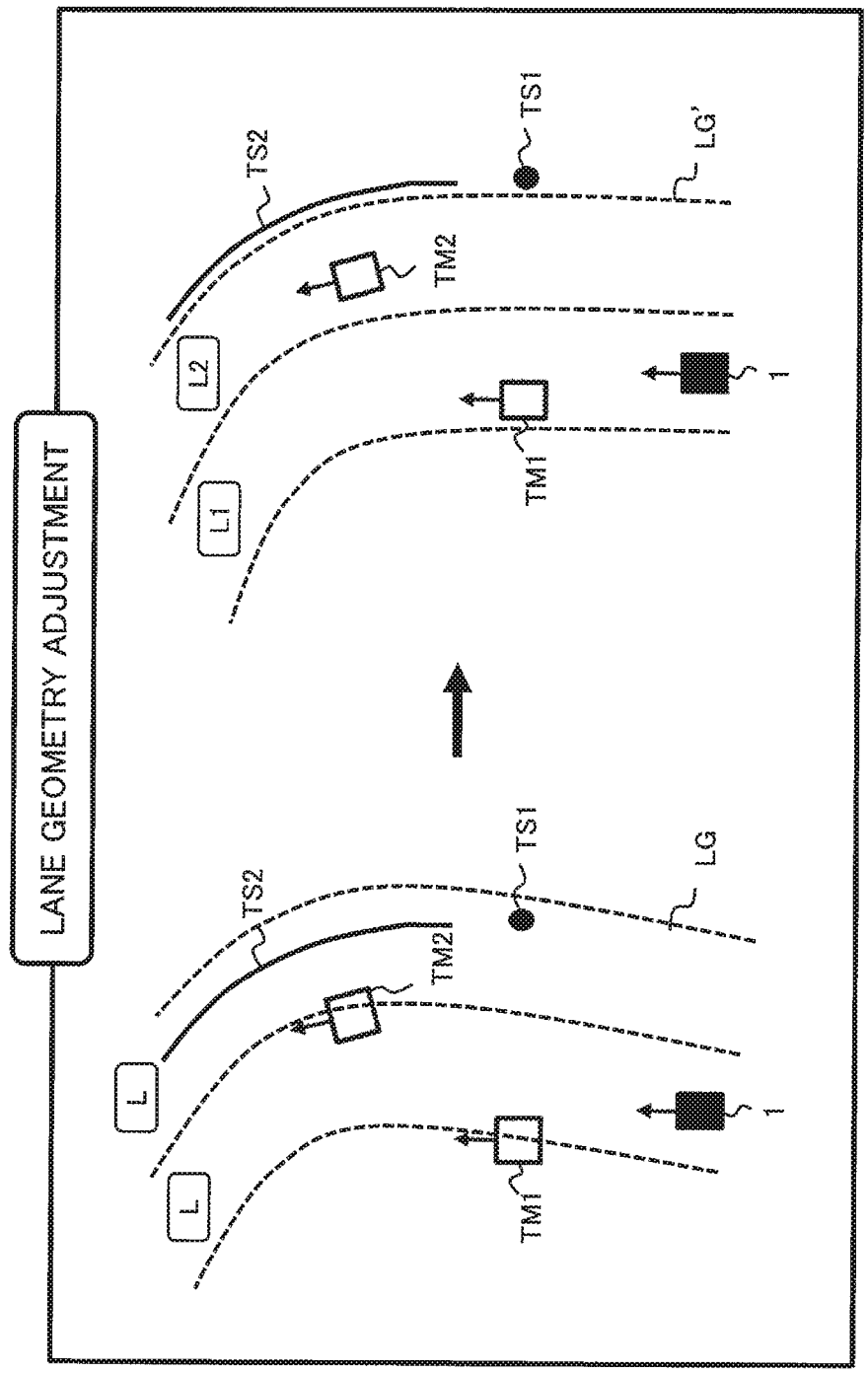
FIG. 2 is a conceptual diagram for explaining lane geometry adjustment processing according to the embodiment of the present disclosure.

FIG. 2 is a conceptual diagram for explaining the lane geometry adjustment processing in the present embodiment. Two kinds of lane geometry LG and LG' are illustrated in FIG. 2. The lane geometry LG is a lane geometry acquired from the map data and the position and the orientation of the vehicle 1. The lane geometry LG' is a lane geometry acquired by adjusting the lane geometry LG. The lane geometry LG' after the adjustment is hereinafter referred to as an "adjusted lane geometry LG'."

In general, a vehicle is located within a lane and a roadside structure is located outside of any lane. Therefore, it is highly probable that the moving target TM is located within a lane and the stationary target TS is located outside of any lane. However, in the case of the lane geometry LG before the adjustment show in FIG. 2, the moving targets TM1 and TM2 overlap with a lane boundary and the stationary targets TS1 and TS2 are located within the second lane L2, which is considered to be caused by the error in the vehicle position-orientation information. In view of the above, the lane geometry LG is adjusted such that the moving targets TM1 and TM2 each is located within a lane and the stationary targets TS1 and TS2 each is located outside of any lane, as shown in FIG. 2. In other words, the adjusted lane geometry LG' where the moving targets TM1 and TM2 each is located within a lane and the stationary targets TS1 and TS2 each is located outside of any lane is generated. By using such the adjusted lane geometry LG' consistent with an actual condition, it is possible to further accurately recognize the positional relationship between the surrounding target (TM1, TM2, TS1, TS2) and the surrounding lane (L1, L2).

Note here that, according to the present embodiment, the error in the vehicle position-orientation information is allowed. In an ordinary way of thinking, if there is an error in certain information, we are supposed to make efforts to reduce that error. If there is an error in the vehicle position-orientation information, it is an ordinary way of thinking to seek a way to further enhance accuracy of the vehicle position-orientation information. However, in contrast to the ordinary way of thinking, the present embodiment allows the error in the vehicle position-orientation information. Instead, the "adjustment" of the lane geometry LG, which is acquired from the accurate map data, is performed. By performing such the lane geometry adjustment processing, as shown in FIG. 2, it is possible to recognize with high accuracy the positional relationship between the target and the lane.

As a comparative example, let us consider reducing the error in the vehicle position-orientation information. As an approach to reduce the error in the vehicle position-orientation information, it is considered to increase the number of GPS satellites. In this case, however, enormous amounts of resources and costs are required. According to the present embodiment, there is no need to increase the number of GPS satellites and thus such the problem does not occur.

As another approach, it is considered to correct the vehicle position-orientation information by numerical computation. However, even if the vehicle position-orientation information is corrected, the error thereof is not completely eliminated. Although it may be possible to further reduce the error by making the numerical computation more complicated, the computation load and the computation time increase accordingly. Increase in the computation load and the computation time causes reduction in a speed of the recognition of the positional relationship between the target and the lane, which is not preferable in terms of the driving assist control and the autonomous driving control. Although it may be possible to infinitely complicate the numerical computation for reducing the error, it will not be as effective as that effort.

According to the present embodiment, on the other hand, the error in the vehicle position-orientation information is allowed. Therefore, there is no need to perform the complicated numerical computation for reducing the error in the vehicle position-orientation information. Instead, according to the present embodiment, the lane geometry adjustment processing is performed. Here, the lane geometry adjustment processing is not performed blindly. In the lane geometry adjustment processing, a constraint condition that "the moving target TM is located within a lane and the stationary target TS is located outside of any lane" is imposed. By imposing such the constraint condition, it is possible to achieve rapid convergence of computation required for the lane geometry adjustment processing. That is to say, it is possible to perform the lane geometry adjustment processing without unnecessarily increasing the computation load and the computation time. The constraint condition that "the moving target TM is located within a lane and the stationary target TS is located outside of any lane" is unique to this field. It can be said that the present embodiment reduces the computation load and the computation time by using the constraint condition peculiar to this field.

As described above, the present embodiment is based on a new idea. According to the present embodiment, it is possible to recognize with high accuracy the positional relationship between the target and the lane around the vehicle 1. Hereinafter, a configuration and a processing flow for realizing the present embodiment will be described in detail.

2. Configuration

Figure 3:
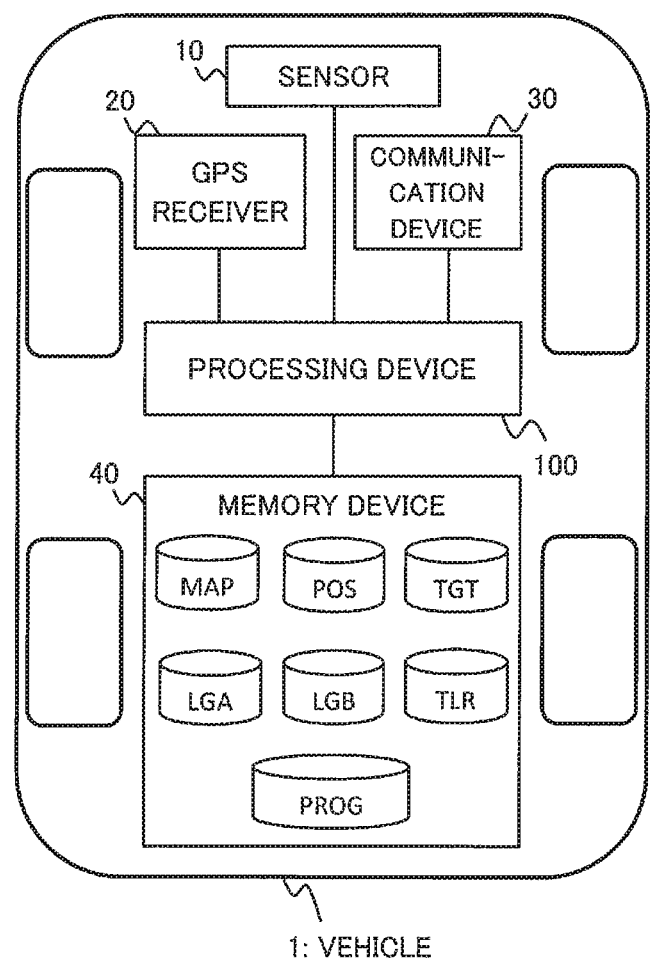
FIG. 3 is a block diagram schematically showing a configuration example of a target-lane relationship recognition apparatus of a vehicle according to the embodiment of the present disclosure.

FIG. 3 is a block diagram schematically showing a configuration example of a target-lane relationship recognition apparatus according to the present embodiment. The target-lane relationship recognition apparatus is mounted on the vehicle 1 and performs processing of recognizing the positional relationship between the target and the lane around the vehicle 1. More specifically, the target-lane relationship recognition apparatus is provided with a sensor 10, a GPS receiver 20, a communication device 30, a memory device 40, and a processing device 100.

The sensor 10 detects a situation around the vehicle 1. Examples of the sensor 10 include a LIDAR (Laser Imaging Detection and Ranging), a millimeter-wave radar, a stereo camera, and so forth. The LIDAR uses laser lights to detect targets around the vehicle 1. The millimeter-wave radar uses radio waves to detect targets around the vehicle 1. The stereo camera images a situation around the vehicle 1. The sensor 10 sends the detected information to the processing device 100.

The GPS receiver 20 receives signals transmitted from a plurality of GPS satellites and calculates the position and the orientation (posture) of the vehicle 1 based on the received signals. The GPS receiver 20 sends the calculated information to the processing device 100.

The communication device 30 performs a V2X communication (i.e. a vehicle-to-vehicle communication and a vehicle-to-infrastructure communication). More specifically, the communication device 30 performs a V2V communication (a vehicle-to-vehicle communication) with another vehicle. In addition, the communication device 30 performs a V2I communication (a vehicle-to-infrastructure communication) with a surrounding infrastructure. Through the V2X communication, the communication device 30 can acquire information on an environment around the vehicle 1. For example, the communication device 30 can acquire another vehicle's lane information indicating a travel lane in which another vehicle around the vehicle 1 is traveling. The communication device 30 sends the acquired information to the processing device 100.

Various kinds of information are stored in the memory device 40. Examples of the memory device 40 include a RAM (Random Access Memory), a ROM (Read Only Memory), a nonvolatile memory, an HDD (Hard Disk Drive), a DVD (Digital Versatile Disk), and so forth.

More specifically, a map data MAP is stored in the memory device 40. Information indicating a boundary position of each lane on a map is beforehand recorded in the map data MAP. The boundary position of each lane is represented by a group of plural elements. For example, the boundary position of each lane is represented by a group of plural points (i.e. a point group). Alternatively, the boundary position of each lane may be represented by a group of plural lines (i.e. a line group).

Moreover, vehicle position-orientation information POS, target information TGT, lane geometry information LGA, adjusted lane geometry information LGB, and target-lane relationship information TLR are stored in the memory device 40. These kinds of information are generated and used in target-lane relationship recognition processing to be described later.

Furthermore, a processing program PROG is stored in the memory device 40. The processing program PROG is a computer program that is read out and executed by the processing device 100. The processing program PROG may be recorded on a computer-readable tangible recording medium.

The processing device 100 is a processor that performs various kinds of information processing. More specifically, the processing device 100 includes a CPU (Central Processing Unit). The processing device 100 and a part of the memory device 40 may constitute a microcomputer.

The processing device 100 reads out the processing program PROG from the memory device 40 and executes it. Thus, the processing device 100 realizes "target-lane relationship recognition processing" according to the present embodiment. In the target-lane relationship recognition processing, the processing device 100 receives necessary information from the sensor 10, the GPS receiver 20, and the communication device 30, and reads out necessary information from the memory device 40. Also, the processing device 100 performs the information processing and writes generated information in the memory device 40.

Figure 4:
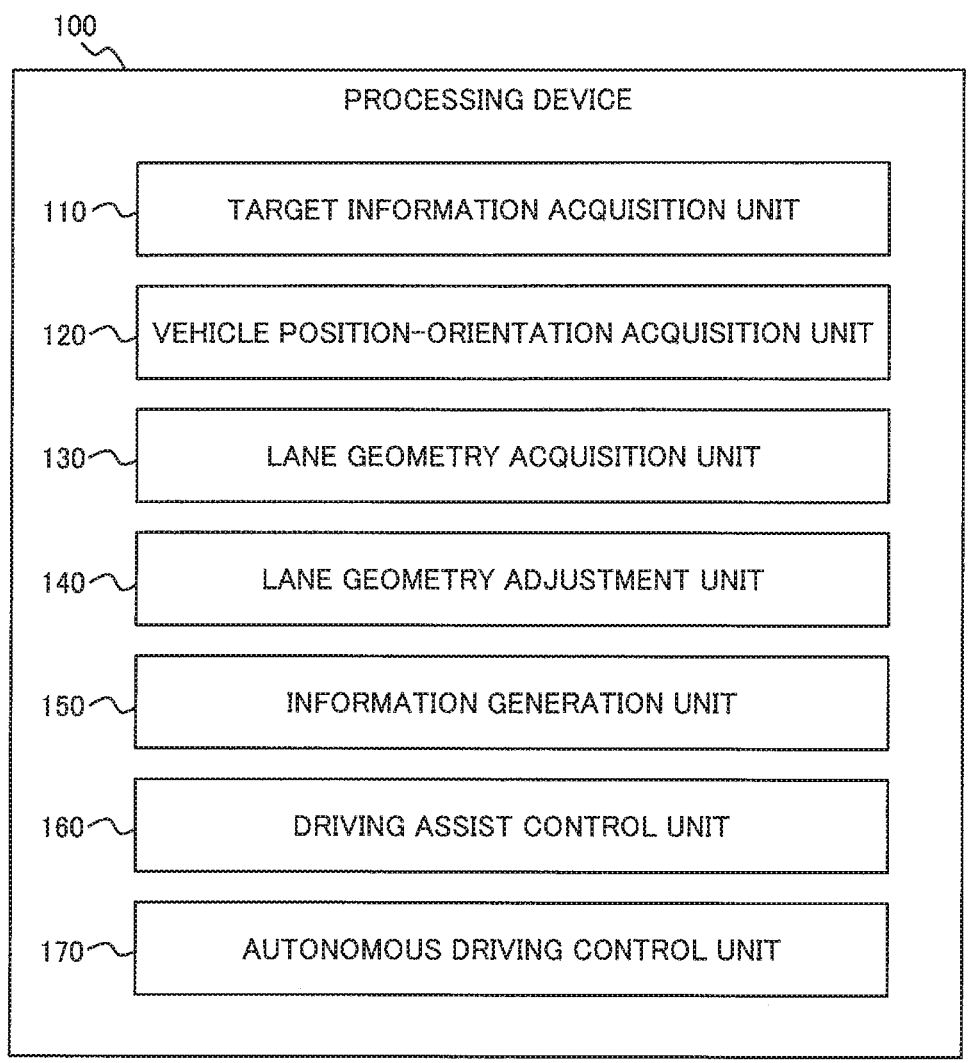
FIG. 4 is a block diagram showing a functional configuration of a processing device of the target-lane relationship recognition apparatus according to the embodiment of the present disclosure.

FIG. 4 is a block diagram showing a functional configuration of the processing device 100 related to the target-lane relationship recognition processing. The processing device 100 has, as functional blocks, a target information acquisition unit 110, a vehicle position-orientation acquisition unit 120, a lane geometry acquisition unit 130, a lane geometry adjustment unit 140, an information generation unit 150, a driving assist control unit 160, and an autonomous driving control unit 170. These functional blocks are realized by the processing device 100 executing the processing program PROG. Hereinafter, the target-lane relationship recognition processing by those functional blocks will be described in detail.

3. Target-Lane Relationship Recognition Processing

Figure 5:
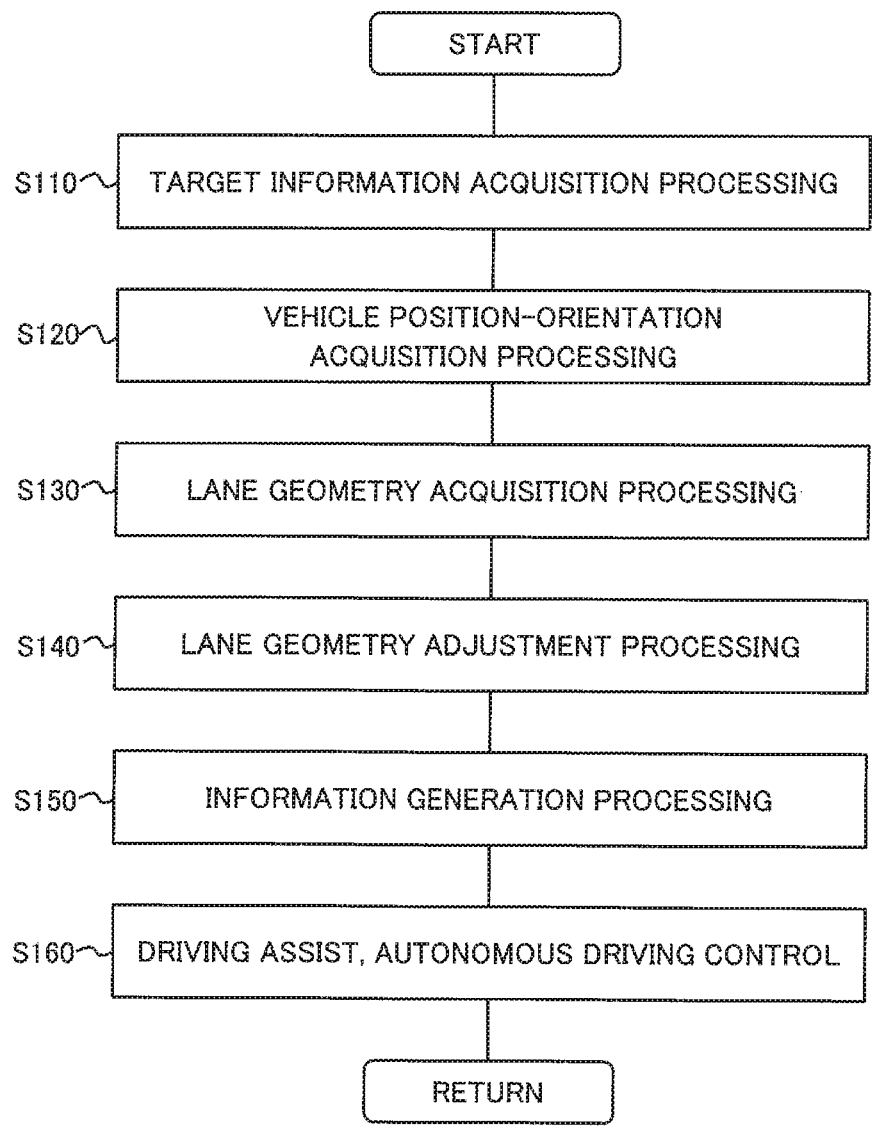
FIG. 5 is a flow chart showing target-lane relationship recognition processing according to the embodiment of the present disclosure.
Figure 6:
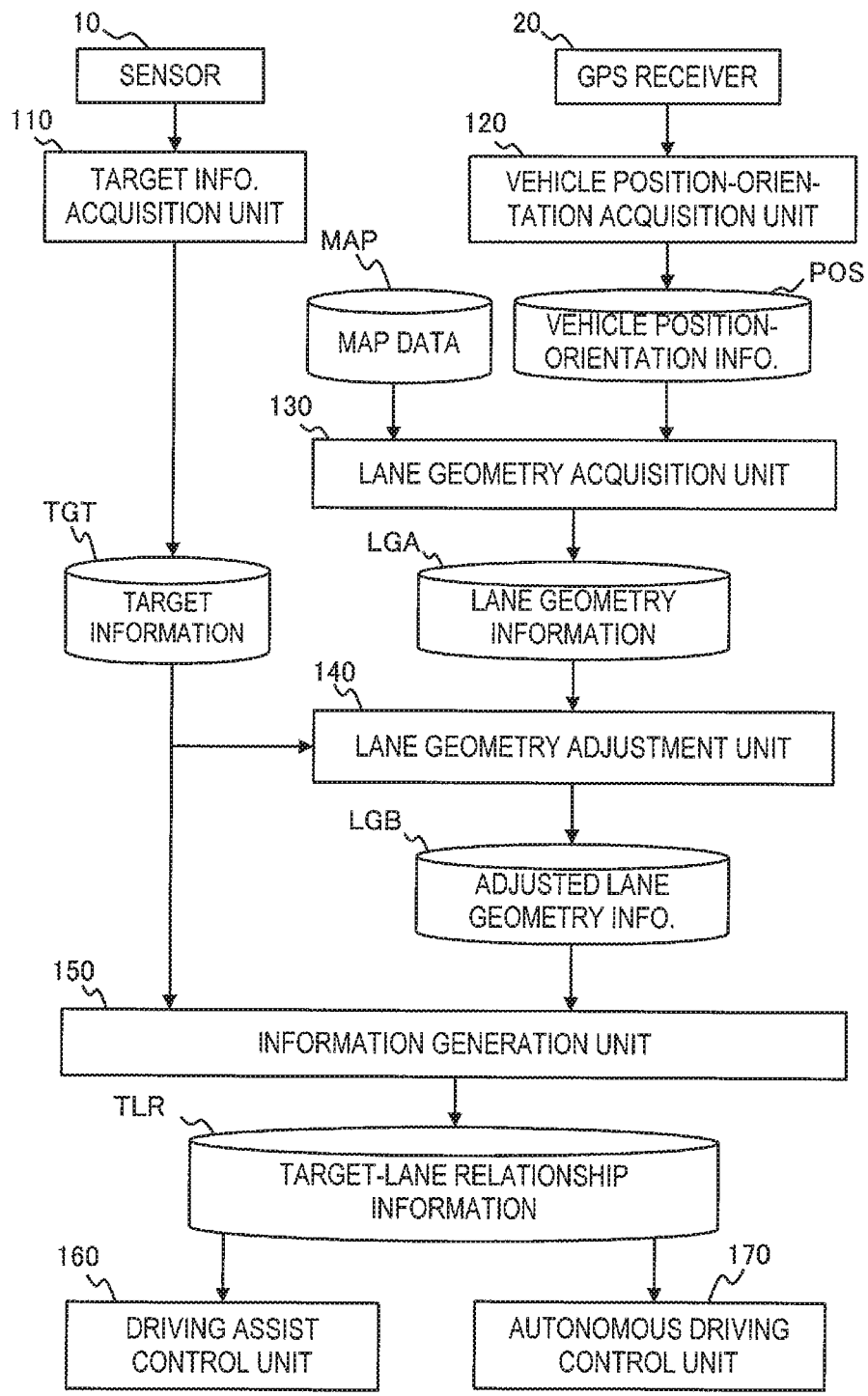
FIG. 6 is a block diagram showing the target-lane relationship recognition processing according to the embodiment of the present disclosure.

FIG. 5 is a flow chart showing the target-lane relationship recognition processing according to the present embodiment. FIG. 6 is a block diagram showing the target-lane relationship recognition processing according to the present embodiment. The target-lane relationship recognition processing according to the present embodiment will be described with appropriate reference to FIGS. 5 and 6.

3-1. Step S110: Target Information Acquisition Processing

The target information acquisition unit 110 performs target information acquisition processing. More specifically, the target information acquisition unit 110 receives the detected information detected by the sensor 10. Based on the detected information received from the sensor 10, the target information acquisition unit 110 recognizes the moving target TM and the stationary target TS around the vehicle 1 by a publicly-known method. Then, the target information acquisition unit 110 generates target information TGT regarding the recognized moving target TM and stationary target TS.

Figure 7:
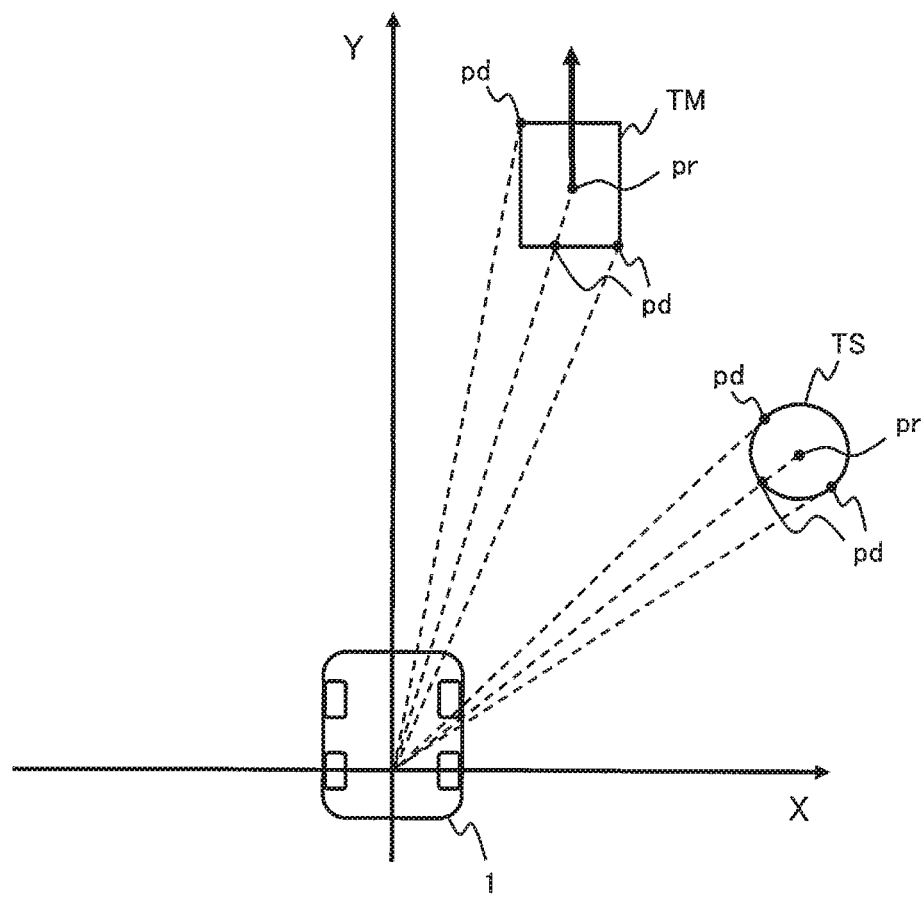
FIG. 7 is a conceptual diagram for explaining target information acquisition processing in the embodiment of the present disclosure.

The target information TGT includes information related to respective positions of the moving target TM and the stationary target TS in a reference frame. An arbitrary orthogonal coordinate system can be used as the reference frame. One example of the reference frame is shown in FIG. 7. In the example, a coordinate origin is a middle point between two rear wheels of the vehicle 1. An X-axis is parallel to a lateral direction of the vehicle 1, and a right direction is set to a positive direction. A Y-axis is parallel to a longitudinal direction of the vehicle 1, and a forward direction is set to a positive direction. The reference frame moves together with the vehicle 1.

As shown in FIG. 7, a range (size) of each target is defined by a plurality of detected points pd. The plurality of detected points pd can be extracted from the detected information received from the sensor 10. A group of the detected points pd related to the same target is determined by clustering processing. A first example of the information related to the position of the target is respective positions of the plurality of detected points pd defining the range of the target.

A second example of the information related to the position of the target is a position of a representative point pr of the target. For example, the representative point pr is a center point of the target that is estimated based on the above-mentioned plurality of detected points pd. Alternatively, the representative point pr may be a center of gravity position of the plurality of detected points pd. Alternatively, the representative point pr is an arbitrary one of the plurality of detected points pd.

A third example of the information related to the position of the target is a trajectory of the target. The trajectory of the target is represented as time-series positions of the representative point pr or the detected point pd.

The target information TGT includes at least one of the above-mentioned three examples as the information related to the position of each of the moving target TM and the stationary target TS. The target information TGT may include a combination of two or more of the above-mentioned three example.

As to the moving target TM, a velocity (velocity vector) thereof can also be calculated. More specifically, the velocity of the moving target TM can be calculated from the time-series positions of the representative point pr or the detected point pd of the moving target TM. The target information TGT may include the velocity of the moving target TM in addition to the information related to the position.

3-2; Step S120: Vehicle Position-orientation Acquisition Processing

The vehicle position-orientation acquisition unit 120 performs vehicle position-orientation acquisition processing. More specifically, the GPS receiver 20 mentioned above calculates a position and an orientation (posture) of the vehicle 1 based on signals from GPS satellites. The vehicle position-orientation acquisition unit 120 receives the information calculated by the GPS receiver 20 and outputs vehicle position-orientation information POS indicating the position and the orientation of the vehicle 1. In the vehicle position-orientation information POS, the position of the vehicle 1 is given, for example, by latitude and longitude.

Figure 8:
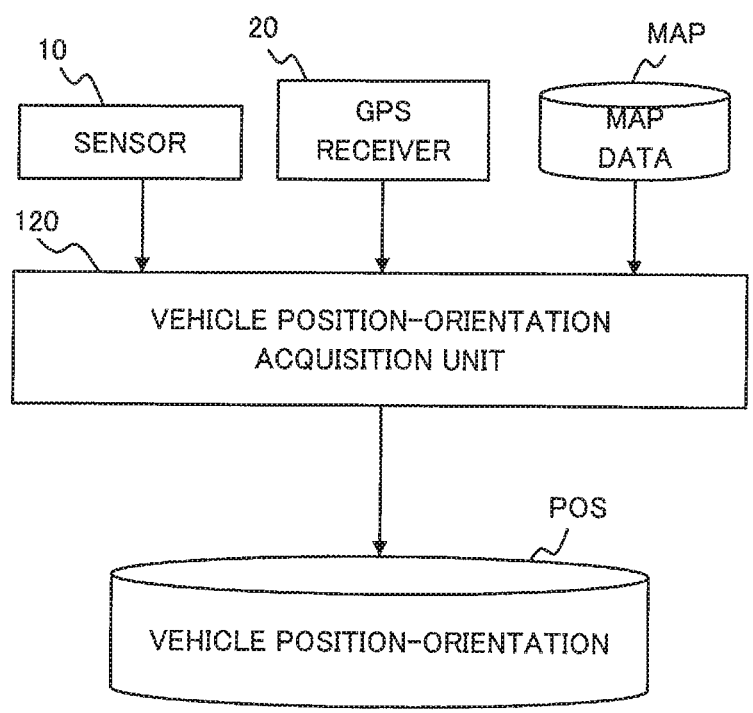
FIG. 8 is a block diagram for explaining a modification example of vehicle position-orientation acquisition processing in the embodiment of the present disclosure.

FIG. 8 shows a modification example of the vehicle position-orientation acquisition processing. In the modification example, the vehicle position-orientation acquisition unit 120 further uses the detected information by the sensor 10 and the map data MAP. More specifically, the sensor 10 includes a camera imaging an environment around the vehicle 1 and outputs an image data. The vehicle position-orientation acquisition unit 120 extracts feature points from the image data. Examples of the feature point include a white line and a landmark (e.g. signboard, traffic sign). Meanwhile, the feature points are beforehand registered in the map data MAP as well. The vehicle position-orientation acquisition unit 120 grasps a rough position of the vehicle 1 on the basis of the information received from the GPS receiver 20 to read the map data MAP around the vehicle 1. Then, the vehicle position-orientation acquisition unit 120 searches for a position and an orientation of the vehicle 1 in which the feature points extracted from the image data and the feature points registered in the map data MAP match most. Even with this method, the vehicle position-orientation information POS can be acquired.

It should be noted that, in the present embodiment, the error in the vehicle position-orientation information POS is allowed. Therefore, excessive calculation processing for reducing the error in the vehicle position-orientation information POS is unnecessary. Even when the modification example as shown in FIG. 8 is adopted, it is enough to obtain some degree of accuracy.

3-3. Step S130: Lane Geometry Acquisition Processing

The lane geometry acquisition unit 130 performs lane geometry acquisition processing. More specifically, the lane geometry acquisition unit 130 reads the vehicle position-orientation information POS to grasp the position and the orientation of the vehicle 1. Meanwhile, the information indicating the boundary position of each lane on the map is recorded in the map data MAP. Based on the position of the vehicle 1, the lane geometry acquisition unit 130 acquires the boundary position of the lane around the vehicle 1 from the map data MAP. Then, the lane geometry acquisition unit 130 considers the position and the orientation of the vehicle 1 to convert the boundary position of the lane on the map into the lane geometry LG in the reference frame mentioned above.

Figure 9:
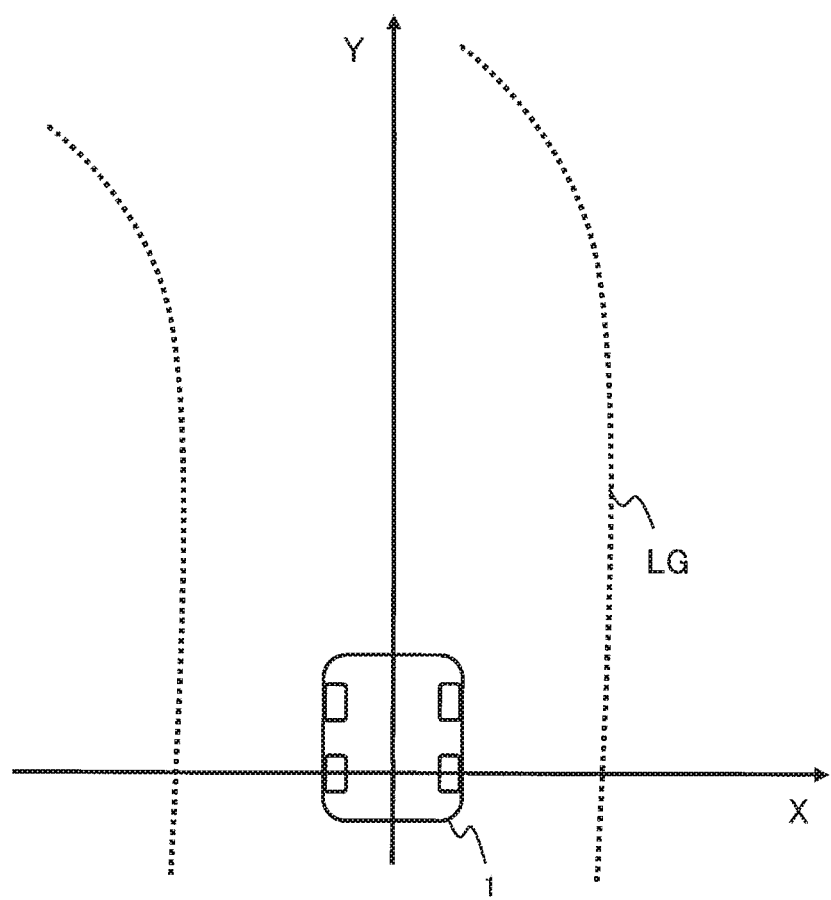
FIG. 9 is a conceptual diagram for explaining lane geometry acquisition processing in the embodiment of the present disclosure.

FIG. 9 illustrates the lane geometry LG in the reference frame. The boundary of the lane is represented by a group of plural elements (i.e. points or lines). An overall shape of the group is a "lane shape." It can be said that the lane shape is a relative positional relationship between the plural elements constituting the group. A position of the group in the reference frame is a "lane position." An orientation (rotation) of the group in the reference frame is a "lane orientation." The "lane geometry LG" in the present embodiment is a concept including the lane shape, the lane position, and the lane orientation. It can be said that the lane geometry LG is a geometry of the group of plural elements in the reference frame.

In this manner, the lane geometry acquisition unit 130 acquires the lane geometry LG around the vehicle 1 based on the map data MAP and the vehicle position-orientation information POS. Information indicating the lane geometry LG is lane geometry information LGA. The lane geometry acquisition unit 130 generates and outputs the lane geometry information LGA.

3-4. Step S140: Lane Geometry Adjustment Processing

The lane geometry adjustment unit 140 performs the lane geometry adjustment processing shown in the foregoing FIG. 2. More specifically, the lane geometry adjustment unit 140 reads the lane geometry information LGA and adjusts the lane geometry LG indicated by the lane geometry information LGA to generate the adjusted lane geometry LG'. At this time, the lane geometry adjustment unit 140 reads the target information TGT as well and imposes the constraint condition that "the moving target TM is located within a lane and the stationary target TS is located outside of any lane." That is, the lane geometry adjustment unit 140 generates the adjusted lane geometry LG' by adjusting the lane geometry LG such that the constraint condition is satisfied. Information indicating the adjusted lane geometry LG' is adjusted lane geometry information LGB. The lane geometry adjustment unit 140 generates and outputs the adjusted lane geometry information LGB.

As described above, the lane geometry adjustment processing is performed instead of allowing the error in the vehicle position-orientation information POS. The error in the vehicle position-orientation information POS means errors of the position and the orientation of the vehicle 1 and thus affects the lane position and the lane orientation among the lane geometry LG. Therefore, it is enough to adjust the lane position and the lane orientation in the lane geometry adjustment processing. Since the lane shape (i.e. the relative positional relationship between the plural elements constituting the group) is accurate, there is no need to adjust the lane shape. By maintaining the lane shape without change, accuracy of the lane geometry adjustment processing is increased.

However, the present embodiment does not eliminate a case where the lane shape also is changed. For example, in order to reduce a computation amount, the lane geometry LG may be simplified by thinning out a part of the plural elements representing the lane geometry LG. In this case, the lane shape also changes somewhat in the lane geometry adjustment processing. The lane shape is allowed to be changed in this manner as long as the original lane shape is sufficiently reflected.

Hereinafter, a variety of concrete examples of the lane geometry adjustment processing will be described.

FIRST EXAMPLE

The target information TGT includes a position of the representative point pr (see FIG. 7) of the moving target TM. In this case, the lane geometry adjustment unit 140 performs the lane geometry adjustment processing such that a constraint condition that "the representative point pr of the moving target TM is located within a lane and the stationary target TS is located outside of any lane" is satisfied.

For example, a plurality of conversion functions for converting the lane position and the lane orientation are prepared in advance. The lane geometry adjustment unit 140 applies the plurality of conversion functions to the lane geometry LG to generate a plurality of converted lane geometries, respectively. Then, the lane geometry adjustment unit 140 selects, as a candidate, a converted lane geometry satisfying the above-mentioned constraint condition out of the plurality of converted lane geometries. If there is only one candidate, the one candidate is selected as the adjusted lane geometry LG'.

If there are a plurality of candidates, the lane geometry adjustment unit 140 selects one of the plurality of candidates as the adjusted lane geometry LG'. For example, some points on the lane geometry LG are extracted as sample points, and an average value of respective movement amounts of the sample points due to the application of the conversion function is calculated as a "conversion amount". Then, a candidate with the smallest conversion amount is selected as the adjusted lane geometry LG'.

As another example, with respect to each candidate, a distance between the representative point pr of the moving target TM and a center line of a lane to which the moving target TM belongs is calculated, and a sum of distances for all the moving targets TM is calculated. Then, a candidate with the smallest sum is selected as the adjusted lane geometry LG'.

In the case where the representative point pr is used, the lane geometry adjustment processing is simplified, which is preferable from a viewpoint of reduction in the computation load.

SECOND EXAMPLE

The target information TGT includes respective positions of the plurality of detected points pd (see FIG. 7) defining a range (i.e. a size) of the moving target TM. In this case, the lane geometry adjustment unit 140 performs the lane geometry adjustment processing such that a constraint condition that "all of the plurality of detected points pd related to a single moving target TM are located within a same lane and the stationary target TS is located outside of any lane" is satisfied. Others are the same as the first example. According to the second example, the range (i.e. size) of the moving target TM is taken into account, and thus the accuracy of the lane geometry adjustment processing is increased.

THIRD EXAMPLE

The target information TGT includes a trajectory of the moving target TM. In this case, the lane geometry adjustment unit 140 performs the lane geometry adjustment processing such that a constraint condition that "the trajectory of a single moving target TM is located within a same lane and the stationary target TS is located outside of any lane" is satisfied. Others are the same as the first example. According to the third example, the trajectory of the moving target TM is taken into account, and thus the accuracy of the lane geometry adjustment processing is increased.

FOURTH EXAMPLE

According to a fourth example, an additional constraint condition is added to any of the foregoing constraint conditions. That is, the fourth example is used supplementarily. More specifically, in the fourth example, the target information TGT includes not only the position but also a velocity of the moving target TM. Based on the position and the velocity, the lane geometry adjustment unit 140 predicts a future position of the moving target TM after a certain period of time. Then, the lane geometry adjustment unit 140 adds "the future position of the moving target TM remaining in the same lane as the current position" to the constraint condition. Since the constraint condition considering the future position is added, the accuracy of the lane geometry adjustment processing is further increased.

FIFTH EXAMPLE

According to a fifth example, an additional constraint condition is added to any of the foregoing constraint conditions. That is, the fifth example is used supplementarily. More specifically, in the fifth example, the target information TGT includes not only the position but also the velocity of the moving target TM. The lane geometry adjustment unit 140 calculates a tangent line of a lane boundary closest to the moving target TM. Then, the lane geometry adjustment unit 140 adds "an angle between the calculated tangent line and the velocity vector of the moving target TM being equal to or less than a threshold value" to the constraint condition. This additional constraint condition means that a traveling direction of the moving target TM is adequately consistent with the adjusted lane geometry LG'. As a result of the addition of such the constraint condition, the accuracy of the lane geometry adjustment processing is further increased.

SIXTH EXAMPLE

According to a sixth example, an additional constraint condition is added to any of the foregoing constraint conditions. That is, the sixth example is used supplementarily. More specifically, in the sixth example, a "lane changing target TLC" is taken into consideration. The lane changing target TLC is a moving target in a middle of lane changing, and treated separately from the moving target TM mentioned above.

Recognition of the lane changing target TLC is as follows. For example, the sensor 10 includes a camera. Based on image information obtained by the camera, the target information acquisition unit 110 recognizes the lane changing target TLC around the vehicle 1. For example, the target information acquisition unit 110 can recognize the lane changing target TLC by detecting blinking of a blinker. Alternatively, the target information acquisition unit 110 can recognize, as the lane changing target TLC, another vehicle located on a lane boundary in the image information.

Figure 10:
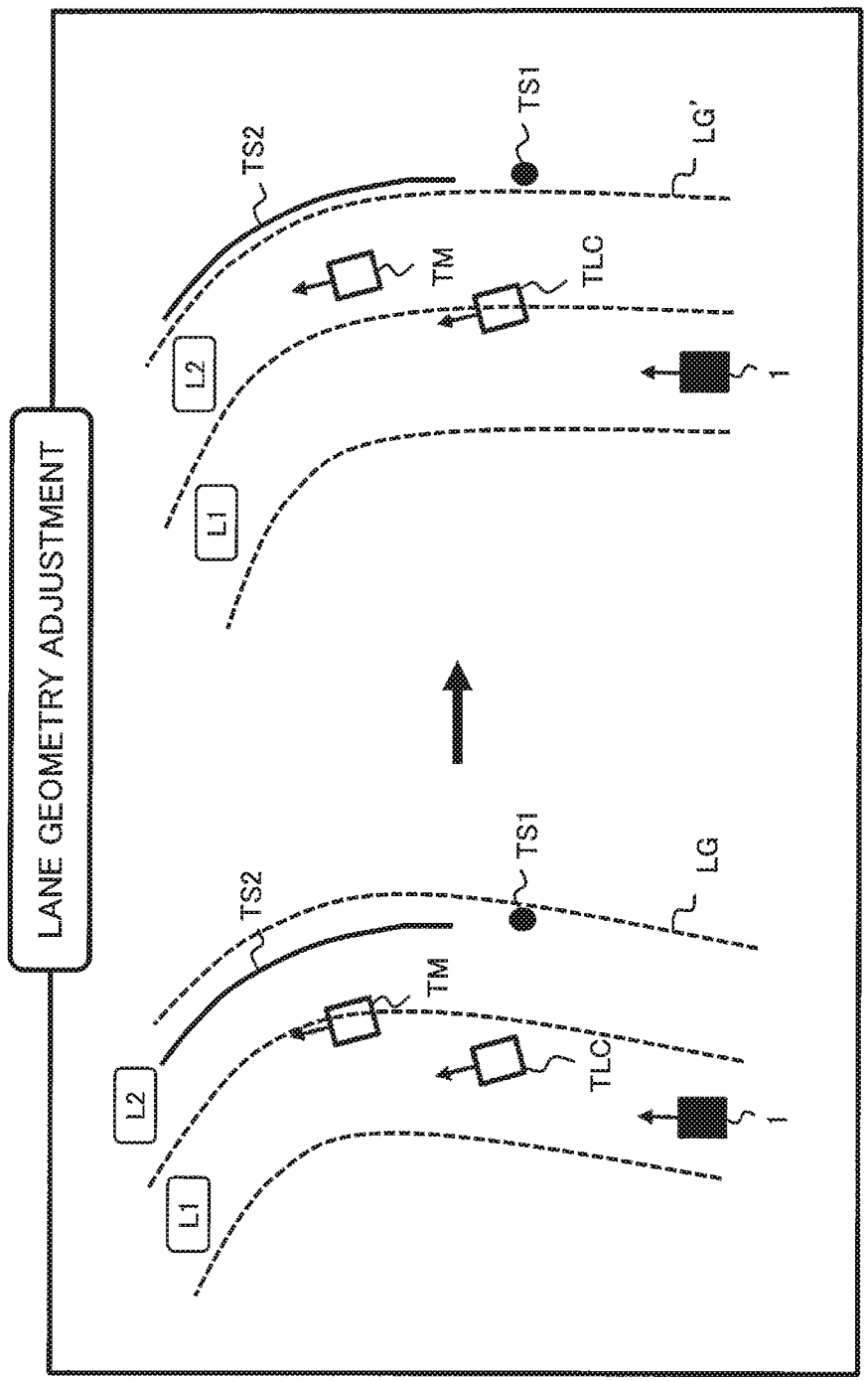
FIG. 10 is a conceptual diagram for explaining a sixth example of the lane geometry adjustment processing in the embodiment of the present disclosure.

The target information TGT further includes information regarding a position of the lane changing target TLC in the reference frame. In this case, the lane geometry adjustment unit 140 adds "the lane changing target TLC overlapping a lane boundary" as shown in FIG. 10 to the constraint condition. Since the constraint condition considering the lane changing target TLC is added, the accuracy of the lane geometry adjustment processing is further increased.

SEVENTH EXAMPLE

Figure 11:
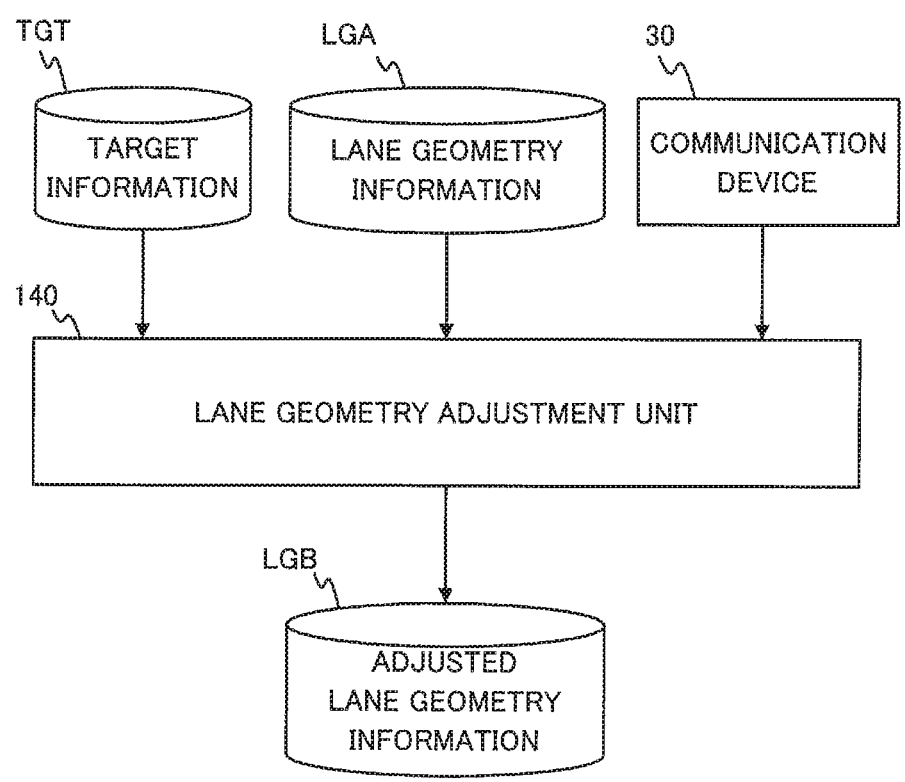
FIG. 11 is a conceptual diagram for explaining a seventh example of the lane geometry adjustment processing in the embodiment of the present disclosure.

According to a seventh example, an additional constraint condition is added to any of the foregoing constraint conditions. That is, the seventh example is used supplementarily. More specifically, as shown in FIG. 11, the lane geometry adjustment unit 140 receives information from the communication device 30 performing the V2X communication. The received information includes another vehicle's lane information indicating a travel lane in which another vehicle around the vehicle 1 is traveling. In this case, the lane geometry adjustment unit 140 adds "any moving target TM being located within the travel lane indicated by the another vehicle's lane information" to the constraint condition. Since the constraint condition considering the information acquired through the V2X communication is added, the accuracy of the lane geometry adjustment processing is further increased.

EIGHTH EXAMPLE

According to an eighth example, an additional constraint condition is added to any of the foregoing constraint conditions. That is, the eighth example is used supplementarily. In the eighth example, a "white line position around the vehicle 1" is taken into consideration.

Figure 12:
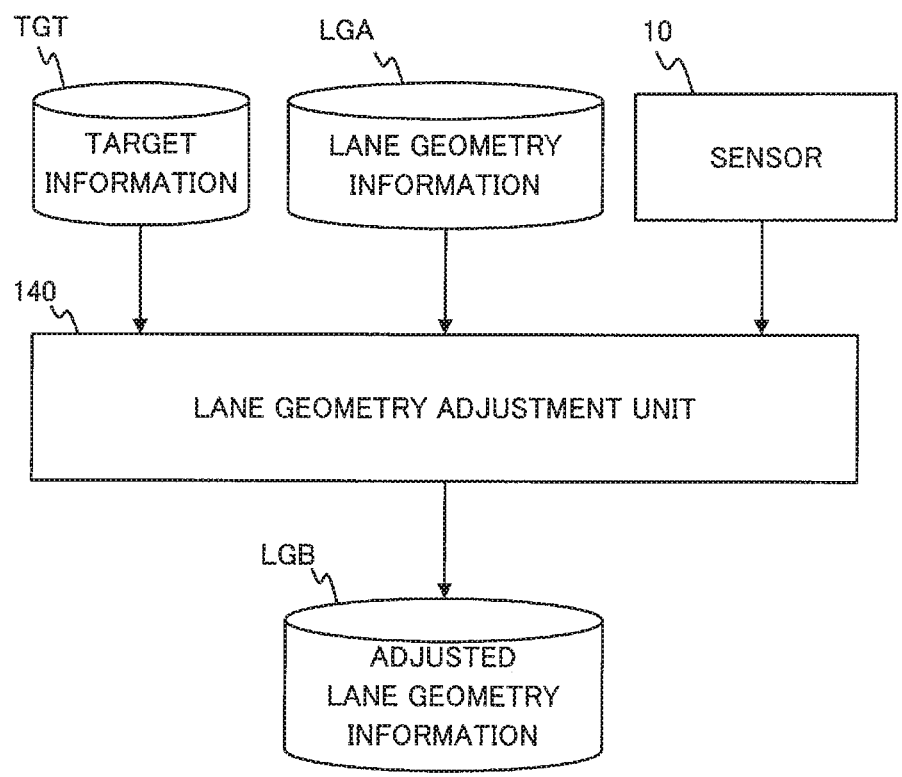
FIG. 12 is a conceptual diagram for explaining an eighth example of the lane geometry adjustment processing in the embodiment of the present disclosure.

More specifically, as shown in FIG. 12, the lane geometry adjustment unit 140 receives the detected information from the sensor 10. The sensor 10 includes a camera. Based on image information obtained by the camera, the lane geometry adjustment unit 140 performs white line recognition processing that is publicly known. By performing the white line recognition processing, the lane geometry adjustment unit 140 recognizes a white line position around the vehicle 1 in the reference frame. Typically, the white line position is represented by a group of plural pixels. In this case, a distance between each white line pixel and its closest lane boundary can be calculated. Then, a sum or an average of the distances for all the recognized white line pixels is calculated as a "distance between the white line position and the lane boundary."

The lane geometry adjustment unit 140 adds "the distance between the white line position and the lane boundary being equal to or less than a threshold value" to the constraint condition. Alternatively, in a case where the plurality of conversion functions as described in the first example are used, the lane geometry adjustment unit 140 selects, as the adjusted lane geometry LG', one candidate with "the smallest distance between the white line position and the lane boundary" out of the candidates satisfying the constraint condition. This additional constraint condition means that the adjusted lane geometry LG' is consistent with an actual white line position. As a result of the addition of such the constraint condition, the accuracy of the lane geometry adjustment processing is further increased.

NINTH EXAMPLE

When in a traffic jam, another vehicle that should be determined as the moving target TM may be erroneously determined as the stationary target TS. If the lane geometry adjustment processing is performed in that case, the other vehicle is likely to go out of any lane. Therefore, when in a traffic jam, the lane geometry adjustment unit 140 may skip the lane geometry adjustment processing. In this case, the lane geometry adjustment unit 140 outputs the lane geometry information LGA as it is as the adjusted lane geometry information LGB. For example, road traffic information or an average speed of targets in the field of view can be used for determining the traffic jam.

It should be noted that it is also possible to combine some of the first to ninth examples with each other in so far as they are not contradictory to each other.

3-5. Step S150: Information Generation Processing

The information generation unit 150 performs information generation processing. More specifically, the information generation unit 150 reads the target information TGT and the adjusted lane geometry information LGB. Then, the information generation unit 150 generates target-lane relationship information TLR indicating a positional relationship between each target and the adjusted lane geometry LG'.

For example, the target-lane relationship information TLR includes information on whether each target is located within or outside of a lane, information on which lane the moving target TM belongs to, and so forth. For example, in the case of the adjusted lane geometry LG' shown in FIG. 2, the target-lane relationship information TLR includes such information that the moving target TM1 belongs to the first lane L1, the moving target TM2 belongs to the second lane L2, the stationary targets TS1 and TS2 are located outside of lane (or on the roadside of the second lane L2), and so forth.

3-6. Step S160: Driving Assist Control, Autonomous Driving Control

The driving assist control unit 160 uses the target-lane relationship information TLR to perform the driving assist control. Let us consider "follow-up traveling" as an example of the driving assist control. The driving assist control unit 160 determines, as a preceding vehicle (tracking target), the closest one of the moving targets TM traveling ahead in the same lane as the vehicle 1. In the example shown in FIGS. 1 and 2, the moving target TM1 traveling ahead in the same first lane L1 as the vehicle 1 is the preceding vehicle. The driving assist control unit 160 controls the vehicle 1 to follow the preceding vehicle with a certain inter-vehicle distance.

The autonomous driving control unit 170 uses the target-lane relationship information TLR to perform the autonomous driving control. The "follow-up traveling" described above can be performed also in the autonomous driving control. As another example, let us consider "automatic lane change." If a speed of the preceding vehicle is below a speed limit and no other vehicle exists in a certain range in an adjacent lane in the vicinity of the vehicle 1, the autonomous driving control unit 170 controls the vehicle 1 to move to the adjacent lane.

4. Effects

According to the present embodiment, as described above, the vehicle 1 acquires the target information regarding the moving target TM and the stationary target TS around the vehicle 1 based on the result of detection by the sensor 10. Moreover, the vehicle 1 acquires the lane geometry LG around the vehicle 1 based on the map data MAP and the vehicle position-orientation information POS. Furthermore, the vehicle 1 performs the lane geometry adjustment processing to generate the adjusted lane geometry LG' that satisfies the constraint condition consistent with an actual condition. By using the adjusted lane geometry LG', it is possible to recognize with high accuracy the positional relationship between the target and the lane around the vehicle 1.

In the case of the technique disclosed in Patent Literature 1 (JP-2007-253714), the lane shape in front of the vehicle is estimated based on the road curvature at the current position. However, according to the present embodiment, such the estimation based on the local road curvature is unnecessary. According to the present embodiment, the lane geometry LG around the vehicle 1 is acquired from the accurate map data MAP. It is therefore possible to know the lane geometry LG around the vehicle 1 more accurately as compared with the technique disclosed in Patent Literature 1. As a result, the accuracy of recognition of the positional relationship between the surrounding target and the surrounding lane is enhanced.

It should be noted that the vehicle position-orientation information POS is required for acquiring the lane geometry LG from the map data MAP. The vehicle position-orientation information POS is likely to include an error. According to the present embodiment, the lane geometry adjustment processing is performed in consideration of the error in the vehicle position-orientation information POS. In another word, the lane geometry LG is adjusted such that the error in the vehicle position-orientation information POS is canceled out. By performing such the lane geometry adjustment processing, the accuracy of recognition of the positional relationship between the surrounding target and the surrounding lane is further enhanced.

The lane geometry adjustment processing is not performed blindly. In the lane geometry adjustment processing, the constraint condition that "the moving target TM is located within a lane and the stationary target TS is located outside of any lane" is imposed. By imposing such the constraint condition, it is possible to achieve rapid convergence of computation required for the lane geometry adjustment processing. That is to say, it is possible to perform the lane geometry adjustment processing without unnecessarily increasing the computation load and the computation time. The constraint condition that "the moving target TM is located within a lane and the stationary target TS is located outside of any lane" is unique to this field. It can be said that the present embodiment reduces the computation load and the computation time by using the constraint condition peculiar to this field.

Note here that, according to the present embodiment, the error in the vehicle position-orientation information POS is allowed. In an ordinary way of thinking, if there is an error in certain information, we are supposed to make efforts to reduce that error. If there is an error in the vehicle position-orientation information POS, it is an ordinary way of thinking to seek a way to further enhance accuracy of the vehicle position-orientation information POS. However, in contrast to the ordinary way of thinking, the present embodiment allows the error in the vehicle position-orientation information POS. Instead, the lane geometry adjustment processing is performed.

As a comparative example, let us consider reducing the error in the vehicle position-orientation information POS. As an approach to reduce the error in the vehicle position-orientation information POS, it is considered to increase the number of GPS satellites. In this case, however, enormous amounts of resources and costs are required. According to the present embodiment, there is no need to increase the number of GPS satellites and thus such the problem does not occur.

As described above, the present embodiment is based on a new idea. According to the present embodiment, it is possible to recognize with high accuracy the positional relationship between the target and the lane around the vehicle 1.

What is claimed is:

1. A target-lane relationship recognition apparatus mounted on a vehicle, comprising:
    a sensor configured to detect a situation around the vehicle;
    a memory device in which a map data indicating a boundary position of a lane on a map is stored; and
    a processor configured to perform:
    target information acquisition processing that acquires, based on a result of detection by the sensor, target information regarding a moving target and a stationary target around the vehicle;
    lane geometry acquisition processing that acquires, based on the map data and a position and an orientation of the vehicle, lane geometry information indicating a lane geometry around the vehicle;
    lane geometry adjustment processing that adjusts the lane geometry to generate an adjusted lane geometry satisfying a condition that the moving target is located within a lane and the stationary target is located outside of any lane; and
    information generation processing that generates target-lane relationship information indicating a positional relationship between the moving target and the adjusted lane geometry, wherein
    the lane geometry is represented by a group of plural elements, and
    the processor performs the lane geometry adjustment processing such that the adjusted lane geometry maintains a relative positional relationship between the plural elements.

2. The target-lane relationship recognition apparatus according to claim 1, wherein
    the target information includes a position of a representative point of the moving target, and
    the condition includes the representative point being located within the lane within which the moving target is located.

3. The target-lane relationship recognition apparatus according to claim 1, wherein
    the target information includes respective positions of a plurality of detected points defining a size of the moving target, and
    the condition includes all of the plurality of detected points being located within the lane within which the moving target is located.

4. The target-lane relationship recognition apparatus according to claim 1, wherein
    the target information includes a trajectory of the moving target, and
    the condition includes the trajectory being located within the lane within which the moving target is located.

5. The target-lane relationship recognition apparatus according to claim 1, wherein
    the target information includes a position and a velocity of the moving target, and wherein
    in the lane geometry adjustment processing, the processor predicts a future position of the moving target based on the position and the velocity of the moving target, and the condition further includes that the future position of the moving target remains in the same lane as a current position of the moving target.

6. The target-lane relationship recognition apparatus according to claim 1, wherein
    the target information includes a position and a velocity of the moving target, and wherein
    in the lane geometry adjustment processing, the processor calculates a tangent line of a lane boundary closest to the moving target, and adds an angle between the tangent line and a vector of the velocity of the moving target being equal to or less than a threshold value to the condition.

7. The target-lane relationship recognition apparatus according to claim 1, wherein
    in the target information acquisition processing, the processor further acquires target information regarding a lane changing target that is a second moving target in a middle of lane changing, and wherein
    in the lane geometry adjustment processing, the processor adds the lane changing target overlapping a lane boundary to the condition.

8. The target-lane relationship recognition apparatus according to claim 1, further comprising a communication device configured to acquire, through a vehicle-to-vehicle communication or a vehicle-to-infrastructure communication, another vehicle's lane information indicating a travel lane of another vehicle around the vehicle, wherein
    in the lane geometry adjustment processing, the condition further includes that the moving target is located within the travel lane of the another vehicle.

9. The target-lane relationship recognition apparatus according to claim 1, wherein
    in the lane geometry adjustment processing, the processor recognizes a white line position based on the result of detection by the sensor, and adds a distance between the white line position and a lane boundary being equal to or less than a threshold value to the condition.

10. The target-lane relationship recognition apparatus according to claim 1, wherein
    the processor further performs a driving assist control or an autonomous driving control by using the target-lane relationship information.

* * * * *